United States Patent [19]

Schaub et al.

[11] Patent Number: 5,425,317

[45] Date of Patent: Jun. 20, 1995

[54] PROCESS FOR GASIFYING WASTE MATERIALS WHICH CONTAIN COMBUSTIBLE CONSTITUENTS

[75] Inventors: Georg Schaub, Oberursel; Rainer Reimert, Idstein-Kröffel; Johannes Löffler, Bad Homburg; Hans Beisswenger, Bad Soden, all of Germany

[73] Assignee: Metallgesellschaft Aktiengesellschaft, Frankfurt am Main, Germany

[21] Appl. No.: 139,186

[22] Filed: Oct. 19, 1993

[30] Foreign Application Priority Data

Oct. 21, 1992 [DE] Germany .......... 42 35 412.9

[51] Int. Cl.$^6$ ................................. F23J 3/00
[52] U.S. Cl. ............................. 110/346; 110/216; 110/245
[58] Field of Search ............. 110/211, 214, 216, 235, 110/243, 245, 246, 342, 344, 345, 346

[56] References Cited

U.S. PATENT DOCUMENTS

| | | | |
|---|---|---|---|
| 3,599,610 | 8/1971 | Spector | 122/5 |
| 4,026,679 | 5/1977 | Collin | 48/73 |
| 4,253,409 | 3/1981 | Wormser | 110/347 |
| 4,542,704 | 9/1985 | Brown et al. | 110/347 |
| 4,676,177 | 6/1987 | Engstrom | 110/345 |
| 4,741,290 | 5/1988 | Krieger et al. | 122/4 D |
| 5,048,432 | 9/1991 | Hofmann et al. | 110/345 |

FOREIGN PATENT DOCUMENTS

| | | |
|---|---|---|
| 0120397 | 3/1984 | European Pat. Off. |
| 0233619 | 5/1987 | European Pat. Off. |
| 0468357 | 1/1992 | European Pat. Off. |
| 3426879 | 1/1986 | Germany |
| 3632534 | 4/1987 | Germany |

*Primary Examiner*—Henry A. Bennett
*Assistant Examiner*—William C. Doerrler
*Attorney, Agent, or Firm*—Herbert Dubno

[57] ABSTRACT

The waste materials are gasified in a circulating fluidized bed in a gasification reactor, which is supplied with oxygen-containing gas. A gas-solids mixture is withdrawn from the upper region of the gasification reactor and is fed to a separator. Dust-laden gas and separated solids are separately withdrawn from the separator and the separated solids are recycled at least in part to the lower region of the gasification reactor. Temperatures in the range from 700° to 1000° C. are maintained in the gasification reactor. The dust-laden gas which is withdrawn from the separator has a heating value of about 3000 to 6000 kJ/sm$^3$ and is fed to a combustion chamber and is combusted therein at temperatures from 1200° to 1900° C. Liquid slag is withdrawn from the combustion chamber.

6 Claims, 1 Drawing Sheet

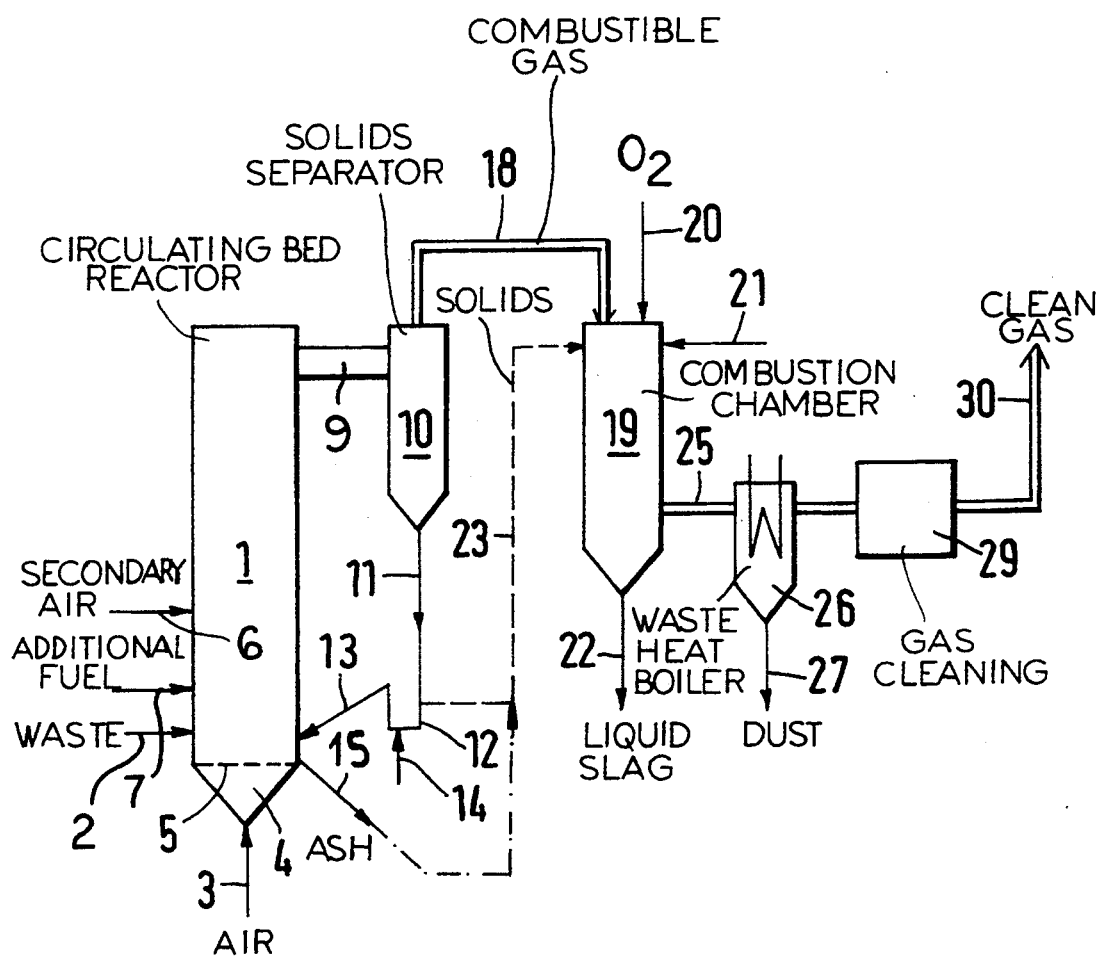

PROCESS FOR GASIFYING WASTE MATERIALS WHICH CONTAIN COMBUSTIBLE CONSTITUENTS

FIELD OF THE INVENTION

Our present invention relates to a process for gasification of waste materials and, more particularly, to the gasification of wastes in a circulating fluidized bed.

BACKGROUND OF THE INVENTION

Waste materials which contain combustible constituents can be gasified in a fluidized state in a gasification reactor which is supplied with an oxygen-containing gas. A gas-solids mixture can be supplied from the upper region of the gasifying reactor to a separator. Dust-containing gas and separated solids can be separately withdrawn from the separator, and the separated solids can be recycled at least in part to the lower region of the gasification reactor.

U.S. Pat. No. 4,469,050 describes the combustion or gasification of this type of carbonaceous material or waste material in a circulating fluidized bed. The reaction takes place in a fluidized state in a reactor, which is succeeded by a cyclone separator. The separated solids from the cyclone are recycled at least in part to the lower region of the reactor.

OBJECTS OF THE INVENTION

It is an object of the invention to effect the gasification of the waste materials in such manner that the rate at which ash is to be separately withdrawn from the gasification reactor is minimized.

It is also an object of the invention to provide an improved gasification whereby the purification of the exhaust gas produced by the gasification should be as inexpensive as possible and the residual solids should be adapted to be processed or dumped at low cost.

SUMMARY OF THE INVENTION

These objects are achieved in accordance with the invention by carrying out the gasification in the gasification reactor at temperatures in the range from 700° to 1000° C. the dust-laden combustible gas having:
a) a carbon content of the dust of 30 to 90% by weight,
b) a free $O_2$ content of the gas not in excess of 1% by volume,
c) a heating value of about 3000 to 6000 $kJ/sm^3$ ($sm^3$ = standard cubic meter or m STP), and
d) a dust content of 5 to 500 $g/sm^3$, is withdrawn from the separator and is fed to a combustion chamber in which the gas is combusted at temperatures of 1200° to 1900° C. to produce a liquid slag, which is separately withdrawn.

When the liquid slag formed in the combustion chamber has been cooled, it has a low elutibility so that it can be utilized (e.g. in construction as an aggregate or filler) or simply dumped without danger of toxic leaching. As a result, the combustion in the combustion chamber eliminates the problem resulting from the pressure of fine dusts which come from the separator and have a considerable carbon content and a non-negligible content of heavy metals. Organic pollutants, particularly dioxins and furans, are entirely destroyed in the combustion chamber at the same time.

To effect in the combustion chamber a heating to sufficiently high temperatures it may be desirable to supply additional fuel in addition to the dust-laden gas coming from the separator.

A further feature of the invention resides in that solids coming from the gasification reactor are fed to the combustion chamber so that the rate at which ash is to be separately withdrawn from the gasification reactor is decreased and liquid slag is formed in the combustible chamber at a higher rate. That liquid slag has only a very low carbon content and, as mentioned thereinbefore, has a low elutibility. The combustion chamber may be so designed that it may be supplied with as much as all of the ash from the gasification reactor.

The conditions in the gasification reactor may be adjusted in known manner in various ways. For instance, water vapor or flue gas may be supplied in addition to the required oxygen consisting, e.g., of air. The air may be enriched with oxygen.

The gasification reactor is preferably supplied with a preheated oxygen-containing gas, such as air, at a temperature in the range from 200° to 600° C.

It may be desirable to supply the gasification reactor with additional fuel, such as coal, together with the waste materials. This is usually necessary particularly during the starting phase of the gasification. In most cases the weight ratio of the waste materials fed to the gasification reactor to the rate at which solids are recycled from the separator to the gasification reactor is in the range from 1:10 to 1:100.

The waste materials to be gasified consist preferably of municipal or industrial waste material or hazardous waste materials. The waste materials may not only consist of solid materials but may consist of sludges or of pasty or semiliquid materials. Inert solids, such as sand or ash withdrawn from the gasification reactor, may be admixed to waste materials having a low solids content.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the process.

SPECIFIC DESCRIPTION

Disintegrated waste materials are supplied through the line 2 to the gasification reactor 1, which is supplied through line 3 with preferably preheated fluidizing air. The air first enters a distributing chamber 4 and then enters the reactor 1 through a nozzle grate 5.

Secondary air, which is preferably also preheated, is fed through line 6. In case of need, additional fuel, such as coal or oil, may be supplied through the line 7. Alternatively, oil or gas-firing combusting means may be employed to sustain the process mainly during the starting phase.

The reactor 1 contains gases and solids in the state of a circulating fluidized bed. A gas-solids mixture leaves the reactor 1 through the duct 9 and is separated in a solids separator, which consists, e.g., of a cyclone 10. Separated solids are recycled through the line 11, the siphon 12 and the line 13 to the lower region of the gasification reactor 1. Additional air is fed at 14 to control the flow of solids through the siphon 12 and the line 13 in a manner known per se. Ash is withdrawn from the gasification reactor through line 15.

The temperatures in the gasification reactor 1 lie in the range from 700° to 1000° C. and preferably are at least 750° C. Because oxygen is supplied to the reactor 1 at a sub-stoichiometric rate, the dust-laden gas which is withdrawn from the cyclone 10 through the line 18 contains combustible constituents and has a considerable heating value. But that gas contains also pollutants and highly toxic constituents, including dioxins and furans.

The gas flowing in line 18 is supplied to a combustion chamber 19 and is subjected therein to a combustion at temperatures in the range from 1200° to 1900° C. Oxygen-containing gas (such as air or oxygen-enriched air or commercially pure oxygen) is supplied from line 20. Line 21 is provided for a supply of additional fuel, such as natural gas or oil. The conditions in the combustion chamber 19 are so selected that liquid slag is formed in addition to the combustion gas. The liquid slag is withdrawn in line 22.

In a modified version of the process, the combustion chamber is supplied also with solids which come from the gasification reactor and are not contained in the gas flowing in line 18. Such solids may be branched off, e.g., adjacent to the siphon, and may be fed to the combustion chamber 19 on the transfer route 23 indicated by a broken line. Besides, a part of the ash conducted in line 15 may be fed to the combustion chamber 19 by means which are not shown in the drawing. The intense combustion in the combustion chamber 19 results in a slag which has a very low residual content of carbon and particularly has a very low elutibility and for this reason can be re-used, e.g., for construction purposes, or may readily be dumped.

Combustion gas is withdrawn from the combustion chamber 19 in line 25 and is cooled and purified by means which are known per se and only schematically shown. Cooling is effected for a recovery of waste heat, and a waste heat boiler 26 for that purpose is indicated, in which some dust is usually separated. That dust is withdrawn in line 27.

The partly cooled combustion gas is then conducted in line 28 to the gas-purifying means 29, which are designed in known manner, e.g., to remove HCl, HF, sulfur compounds, and $NO_x$. For that purpose it is possible to combine dry and wet purification processes, and filters, such as electrostatic precipitators, are required for dedusting. A suitable gas-purifying process is described in DE-C-40 12 887. The cooled and purified combustion gas is finally discharged through the chimney 30.

Dioxins and furans are substantially entirely destroyed in the combustion chamber 19 by the combustion at high temperatures. As a result, the gas flowing in line 25 contains per standard cubic meter only less than 0.01 nanograms of said highly toxic substances, up to about 10 ng/sm$^3$ of which are contained in the gas conducted in line 18.

EXAMPLE

In a plant corresponding to that shown in the drawing, the gasification reactor 1 is operated at temperatures of about 800° C. and under atmospheric pressure to gasify domestic garbage having the following elemental analysis:

| | |
|---|---|
| C | 23% by weight |
| H | 3% by weight |
| O | 15% by weight |
| N | 0.3% by weight |
| S | 0.4% by weight |
| $H_2O$ | 33% by weight |
| Ash | 25.3% by weight |

Air at 350° C. as a gasifying agent is supplied to the reactor at a total rate of 840 sm$^3$ per 1000 kg of garbage. 253 kg ash are thus formed, which contains 2.8% by weight carbon, as well as 1634 sm$^3$ gas, which contains combustible constituents and which is supplied in line 18 to a melting chamber furnace 19. That gas contains 32.6 kg dust having a carbon content of 70% by weight and has a heating value of 3180 kJ/sm and is virtually free of molecular $O_2$. The main components of the gas conducted in line 18 are:

| | | |
|---|---|---|
| $CO_2$ | 10.15% | by volume |
| CO | 7.75% | by volume |
| $H_2$ | 6.22% | by volume |
| $CH_4$ | 2.70% | by volume |
| $C_nH_m$ | 0.60% | by volume |
| $H_2S$ | 0.16% | by volume |
| COS | 0.01% | by volume |
| $NH_3$ | 0.09% | by volume |
| HCN | 0.01% | by volume |
| $N_2$ | 40.73% | by volume |
| $H_2O$ | 31.56% | by volume |

The gas contains also in small amounts particularly HCl, HF, sulfur compounds, nitrogen oxides, dioxins and furans.

The gas from line 18 is combusted at temperatures of about 1500° C. in the melting chamber with 2513 sm$^3$ air at 350° C. without additional fuel. This results in a formation of 1.22 kg liquid slag, which contains 2% by weight C, and of 4045 sm$^3$ flue gas, which is laden with 10.8 kg dust. The flue gas consists mainly of

| | | |
|---|---|---|
| $CO_2$ | 9.84% | by volume |
| $N_2$ | 65.37% | by volume |
| $O_2$ | 6.00% | by volume |
| $SO_2$ | 0.07% | by volume |
| $H_2O$ | 18.72% | by volume | and in addition contains mainly HCl, HF, $SO_2$, and $NO_x$.

To test the elutibility of the slag produced by the combustion in the melting chamber, 100 g slag were boiled in 1 liter water for half an hour and the filtered water was then examined with the following results:

| | |
|---|---|
| Electrical conductivity | 10.2 mS/m |
| Chloride | 3.0 mg/l |
| Fluoride | 0.09 mg/l |
| Chromium | 0.03 mg/l |
| Iron | 0.01 mg/l |
| Lead | 0.002 mg/l |

The content of each of cadmium and cobalt was lower than 0.001 mg/l and the Hg content was below 0.0001 mg/l.

We claim:

1. A process for gasifying waste materials containing combustible constituents, said waste material being municipal or industrial waste material, said process comprising the steps of:
    (a) gasifying said waste material containing combustible materials in a circulating bed in a gasifying reactor by feeding said waste material to said reactor, fluidizing said waste material in said reactor to form a circulating fluidized bed therein in the presence of oxygen at a temperature of 700° to 1000° C., thereby forming a dust-laden combustible gas and ash, withdrawing said ash from a lower region of said reactor, withdrawing said dust-laden combustible gas with solids from said circulating fluidized bed in a gas/solids mixture from an upper region thereof, in a separator separating said gas/solids mixture to separately recover solids and said dust-laden combustible gas therefrom, said dust-laden combustible gas having:

a carbon content of the dust of 30 to 90% by weight, a free $O_2$ content not in excess of 1% by volume, a heating value of about 3,000 to 6,000 $kJ/sm^3$, and a dust content of 5 to 500 $g/sm^3$, and recycling recovered solids to a lower portion of said circulating fluidized bed in said reactor, maintaining a weight ratio between waste material fed to said reactor to solids recycled from said separator to said reactor between 1:10 and 1:100;

(b) feeding said dust-laden combustible gas into a combustion chamber, also feeding said ash into said combustion chamber and burning said dust-laden gas and said ash in said chamber at a temperature of 1200° to 1900° C. to produce a liquid slag and a flue gas;

(c) separately withdrawing said liquid slag and said flue gas from said combustion chamber; and (d) feeding an additional fuel to said combustion chamber for burning of said dust-laden combustible gas and said ash therein.

2. A process for gasifying waste materials containing combustible constituents, said waste material being municipal or industrial waste material, said process comprising the steps of:

(a) gasifying said waste material containing combustible materials in a circulating bed in a gasifying reactor by feeding said waste material to said reactor, fluidizing said waste material in said reactor to form a circulating fluidized bed therein in the presence of oxygen at a temperature of 700° to 1000° C., thereby forming a dust-laden combustible gas and ash, withdrawing said ash from a lower region of said reactor, withdrawing said dust-laden combustible gas with solids from said circulating fluidized bed in a gas/solids mixture from an upper region thereof, in a separator separating said gas/solids mixture to separately recover solids and said dust-laden combustible gas therefrom, said dust-laden combustible gas having:

a carbon content of the dust of 30 to 90% by weight, a free $O_2$ content not in excess of 1% by volume, a heating value of about 3,000 to 6,000 $kJ/sm^3$, and a dust content of 5 to 500 $g/sm^3$, and recycling recovered solids to a lower portion of said circulating fluidized bed in said reactor, maintaining a weight ratio between waste material fed to said reactor to solids recycled from said separator to said reactor between 1:10 and 1:100;

(b) feeding said dust-laden combustible gas into a combustion chamber, also feeding said ash into said combustion chamber and burning said dust-laden gas and said ash in said chamber at a temperature of 1200° to 1900° C. to produce a liquid slag and a flue gas;

(c) separately withdrawing said liquid slag and said flue gas from said combustion chamber; and (d) feeding an additional fuel to said combustion chamber for burning of said dust-laden combustible gas.

3. The process defined in claim 1, further comprising the step of feeding solids from said gasifying reactor to said combustion chamber.

4. The process defined in claim 1 wherein said combustion chamber is supplied with solids from said gasifying reactor at a rate of at least 100 g per $sm^3$ of the combustible gas calculated without solids entrained therein.

5. The process defined in claim 4 wherein said solids supplied to said combustion chamber include ash from said gasifying reactor.

6. The process defined in claim 5, further comprising the step of supplying an oxygen-containing gas to said combustion chamber at a temperature of 200° to 600° C.

* * * * *